(12) United States Patent
Ohta

(10) Patent No.: US 9,406,151 B2
(45) Date of Patent: Aug. 2, 2016

(54) NON-TRANSITORY COMPUTER-READABLE MEDIUM STORING DATA STORAGE PROGRAM, NON-TRANSITORY COMPUTER-READABLE MEDIUM STORING DATA DISPLAY PROGRAM, DATA STORAGE METHOD, AND DATA DISPLAY METHOD

(75) Inventor: Eiji Ohta, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 495 days.

(21) Appl. No.: 13/415,980

(22) Filed: Mar. 9, 2012

(65) Prior Publication Data

US 2012/0236014 A1 Sep. 20, 2012

(30) Foreign Application Priority Data

Mar. 17, 2011 (JP) ................. 2011-059770

(51) Int. Cl.
| | |
|---|---|
| *G06T 1/00* | (2006.01) |
| *G11B 7/007* | (2006.01) |
| *G06T 9/00* | (2006.01) |
| *G01V 1/00* | (2006.01) |
| *G01V 1/44* | (2006.01) |
| *G01V 1/46* | (2006.01) |

(52) U.S. Cl.
CPC . *G06T 9/00* (2013.01); *G01V 1/005* (2013.01); *G01V 1/44* (2013.01); *G01V 1/46* (2013.01)

(58) Field of Classification Search
CPC ........... G01V 1/44; G01V 1/46; G01V 1/005; G06T 9/00
USPC ............ 702/76, 189; 375/240.14; 367/31, 32, 367/48, 75; 369/124.06; 703/2, 10
See application file for complete search history.

(56) References Cited

U.S. PATENT DOCUMENTS

| | | | |
|---|---|---|---|
| 5,265,067 A | * | 11/1993 | Chang .............................. 367/31 |
| 5,384,763 A | * | 1/1995 | Kim ........................ 369/124.06 |
| 5,477,397 A | | 12/1995 | Naimpally et al. |

(Continued)

FOREIGN PATENT DOCUMENTS

| | | |
|---|---|---|
| EP | 1 079 635 A | 2/2001 |
| JP | 4-320558 | 11/1992 |

(Continued)

OTHER PUBLICATIONS

Japanese Office Action dated Jul. 8, 2014 in corresponding Japanese Patent Application No. 2011-059770.

(Continued)

*Primary Examiner* — Carol S Tsai
(74) *Attorney, Agent, or Firm* — Staas & Halsey LLP

(57) ABSTRACT

A non-transitory computer-readable medium stores therein a data storage program causing a computer to execute a process. The process includes obtaining first data by grouping values of spatially discrete distribution points at each of times by each of the spatially discrete distribution points and chronologically sorting the grouped values, obtaining second data by compressing the first data in accordance with at least one of a plurality of compression conditions for each of the distribution points or each group of a plurality of the distribution points, the plurality of compression conditions including a necessity of compression, a compression interval, and a compression algorithm type, and storing the second data in a storage device.

6 Claims, 15 Drawing Sheets

(56) References Cited

U.S. PATENT DOCUMENTS

| | | | | |
|---|---|---|---|---|
| 5,570,305 | A * | 10/1996 | Fattouche et al. | 708/203 |
| 5,594,833 | A * | 1/1997 | Miyazawa | 704/221 |
| 5,638,498 | A * | 6/1997 | Tyler et al. | 358/1.18 |
| 5,687,157 | A * | 11/1997 | Imai et al. | 369/59.16 |
| 5,808,683 | A | 9/1998 | Tong et al. | |
| 7,558,882 | B2 * | 7/2009 | Walsh et al. | 709/247 |
| 7,650,249 | B2 * | 1/2010 | Wegener | 702/66 |
| 7,653,510 | B2 * | 1/2010 | Hirohata | G01R 31/2803 374/E7.042 |
| 8,447,524 | B2 * | 5/2013 | Chen et al. | 702/16 |
| 8,717,203 | B2 * | 5/2014 | Fallon | 341/51 |
| 2002/0141411 | A1 * | 10/2002 | Oh | 370/392 |
| 2008/0130421 | A1 * | 6/2008 | Akaiwa et al. | 368/82 |
| 2008/0189088 | A1 * | 8/2008 | Tani | G06F 17/5018 703/2 |
| 2008/0243408 | A1 * | 10/2008 | Wegener | 702/66 |
| 2009/0175547 | A1 | 7/2009 | Suzuki | |
| 2012/0330931 | A1 * | 12/2012 | Nakano et al. | 707/722 |

FOREIGN PATENT DOCUMENTS

| | | |
|---|---|---|
| JP | 7-75112 | 3/1995 |
| JP | 9-182074 | 7/1997 |
| JP | 9-284139 | 10/1997 |
| JP | 11-41609 | 2/1999 |
| JP | 11-234533 | 8/1999 |
| JP | 2000-201078 | 7/2000 |
| JP | 2002-223194 | 8/2002 |
| JP | 2005-65202 | 3/2005 |
| JP | 2007-249338 | 9/2007 |
| JP | 2008-147880 | 6/2008 |
| JP | 2009-520237 | 5/2009 |
| JP | 2009-165135 | 7/2009 |
| WO | WO 2007/075230 A1 | 7/2007 |

OTHER PUBLICATIONS

Office Action mailed Dec. 2, 2014 for corresponding Japanese Patent Application No. 2011-59770.

English Translation of p. 3, lines 15-20 of Japanese Office Action issued Mar. 31, 2015 in corresponding Japanese Patent Application No. 2011-059770, which was submitted Apr. 8, 2015.

Japanese Office Action dated Jul. 7, 2015 in corresponding Japanese Patent Application No. 2011-059770, 5 pages.

* cited by examiner

| A11 | A12 | A13 | A14 |
|---|---|---|---|
| A21 | A22 | A23 | A24 |
| A31 | A32 | A33 | A34 |
| A41 | A42 | A43 | A44 |

DISTRIBUTION DATA t1

| A11 | A12 | A13 | A14 |
|---|---|---|---|
| A21 | A22 | A23 | A24 |
| A31 | A32 | A33 | A34 |
| A41 | A42 | A43 | A44 |

DISTRIBUTION DATA t2

...

| A11 | A12 | A13 | A14 |
|---|---|---|---|
| A21 | A22 | A23 | A24 |
| A31 | A32 | A33 | A34 |
| A41 | A42 | A43 | A44 |

DISTRIBUTION DATA tn

FIG. 8

→ DATA SEQUENCE

→ DATA SEQUENCE

FIG. 12
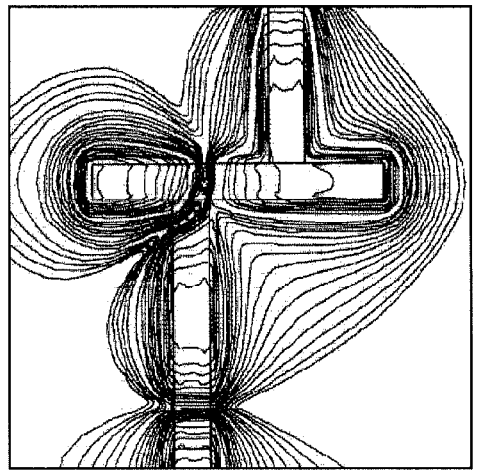
"lpf 01"
TIME [ns]
0.392
ELECTRIC FIELD
[dB (uV/m)]
124.401
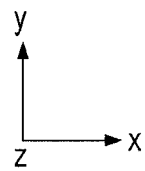
FIG. 13
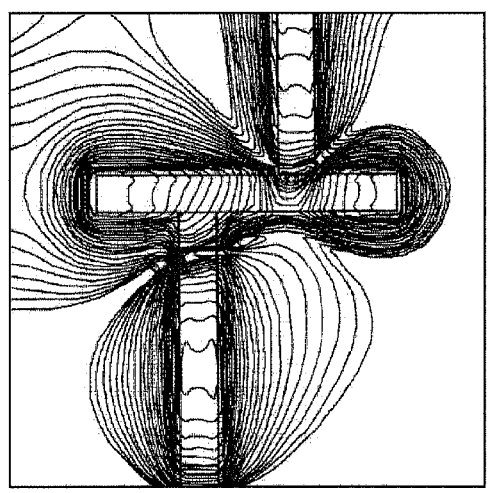
"lpf 01"
TIME [ns]
0.336
ELECTRIC FIELD
[dB (uV/m)]
126.069
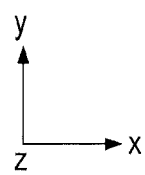

NON-TRANSITORY COMPUTER-READABLE MEDIUM STORING DATA STORAGE PROGRAM, NON-TRANSITORY COMPUTER-READABLE MEDIUM STORING DATA DISPLAY PROGRAM, DATA STORAGE METHOD, AND DATA DISPLAY METHOD

CROSS-REFERENCE TO RELATED APPLICATION

This application is based upon and claims the benefit of priority of the prior Japanese Patent Application No. 2011-059770, filed on Mar. 17, 2011, the entire contents of which are incorporated herein by reference.

FIELD

The embodiments discussed herein are related to a non-transitory computer-readable medium storing a data storage program, a non-transitory computer-readable medium storing a data display program, a data storage method, and a data display method for storing and displaying data.

BACKGROUND

To store time-domain distribution data of spatially discrete physical quantities (physical quantity distribution data), a storage region determined by space (discrete distribution points)×time is used. For example, in the case of FDTD method for solving Maxwell's equation with a difference method in time and space in three dimensional electromagnetic wave analysis, a calculation result thereof is stored in a storage region of 100×100×100×1e-9/10e-15 steps×4 bytes×2=800 GB where computational grid is 100×100×100, a time step is 10 fs, an analysis time is 1 ns, and electric field and magnetic field calculation results of a single cell are stored in a single precision (float type) of 4 bytes.

Since distribution data is stored by using huge resources in a conventional technique, the storage region is reduced by decimating the distribution data by time and space (spatial data for interpolation is calculated from the calculation result which is performed based on the decimated distribution data by setting the storage interval of the distribution data to every n times when the distribution data is to be stored) or by applying a general compression algorithm to the distribution data.

Another conventional technique is also known in which a plurality of structure parameter values used in numeric analysis are read as variable dependent information, conversion information is generated from the variable dependent information, the result information of the numeric analysis is converted on the basis of the conversion information, and the converted result information of the numeric analysis is compressed (see, for example, Japanese Laid-open Patent Publication No. 2007-249338).

If distribution data of an object having a fine or a complex shape in a space is decimated by space and time, the precision and resolution of the distribution data degrade. Thus, the conventional technique is not expected to produce a large effect of reducing the storage region in a practical space model. In addition, the conventional technique has problems of taking recalculation time for displaying the distribution data on physical quantities in a space, and of using a large storage region for displaying the entire region in the space in detail.

Furthermore, the physical quantity distribution data has a small redundancy of physical quantity between spatially adjacent distribution points and depends on a calculation model condition. Therefore, the physical quantity distribution data has such a spatially complex distribution that the application of the general compression algorithm is not expected to yield a high compression ratio.

SUMMARY

According to an aspect of the embodiments, a non-transitory computer-readable medium stores therein a data storage program causing a computer to execute a process. The process includes obtaining first data by grouping values of spatially discrete distribution points at each of times by each of the spatially discrete distribution points and chronologically sorting the grouped values, obtaining second data by compressing the first data in accordance with at least one of a plurality of compression conditions for each of the distribution points or each group of a plurality of the distribution points, the plurality of compression conditions including a necessity of compression, a compression interval, and a compression algorithm type, and storing the second data in a storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an exemplary configuration diagram illustrating physical quantity distribution data pieces as results of electromagnetic field calculation on analysis data at times;

FIG. 7 is an exemplary image diagram illustrating the conventional storage method for the physical quantity distribution data;

FIG. 8 is an exemplary image diagram illustrating the physical quantity distribution data after compression according to the conventional storage method;

FIG. 11 is an exemplary image diagram illustrating the physical quantity distribution data after compression according to the storage method of the embodiment;

FIG. 12 is an exemplary image diagram of distribution data as a result of electromagnetic field calculation;

FIG. 13 is an exemplary image diagram of a distribution map of physical quantity distribution data;

DESCRIPTION OF EMBODIMENTS

An embodiment of the present disclosure will be described with reference to accompanying drawings. In the embodiment, an example is described in which distribution data of physical quantities at discrete distribution points (or lattice points, mesh points, or the like) at each time calculated by a computer is stored as a time waveform (time function: relationship between time and physical quantity) of each distribution point, and a storage region is reduced by applying a general compression algorithm to the time waveform at each distribution point, so that high speed displaying of the distribution data can be achieved. The embodiment thus describes efficient storing and high speed displaying of the distribution data of physical quantities at discrete distribution points at each time calculated by the computer.

A data storage program, a data display program, a data storage method, and a data display method of the embodiment are merely examples and may be programs, devices, and methods with other names. For example, the data storage program, the data display program, the data storage method, and the data display method of the embodiment may each be implemented as a function of a data analysis program or the like. The data storage program and the data display program of the embodiment may be executed by a single personal computer or server computer, or may be implemented by a plurality of personal computers or server computers in a distributed manner.

Figure 1:
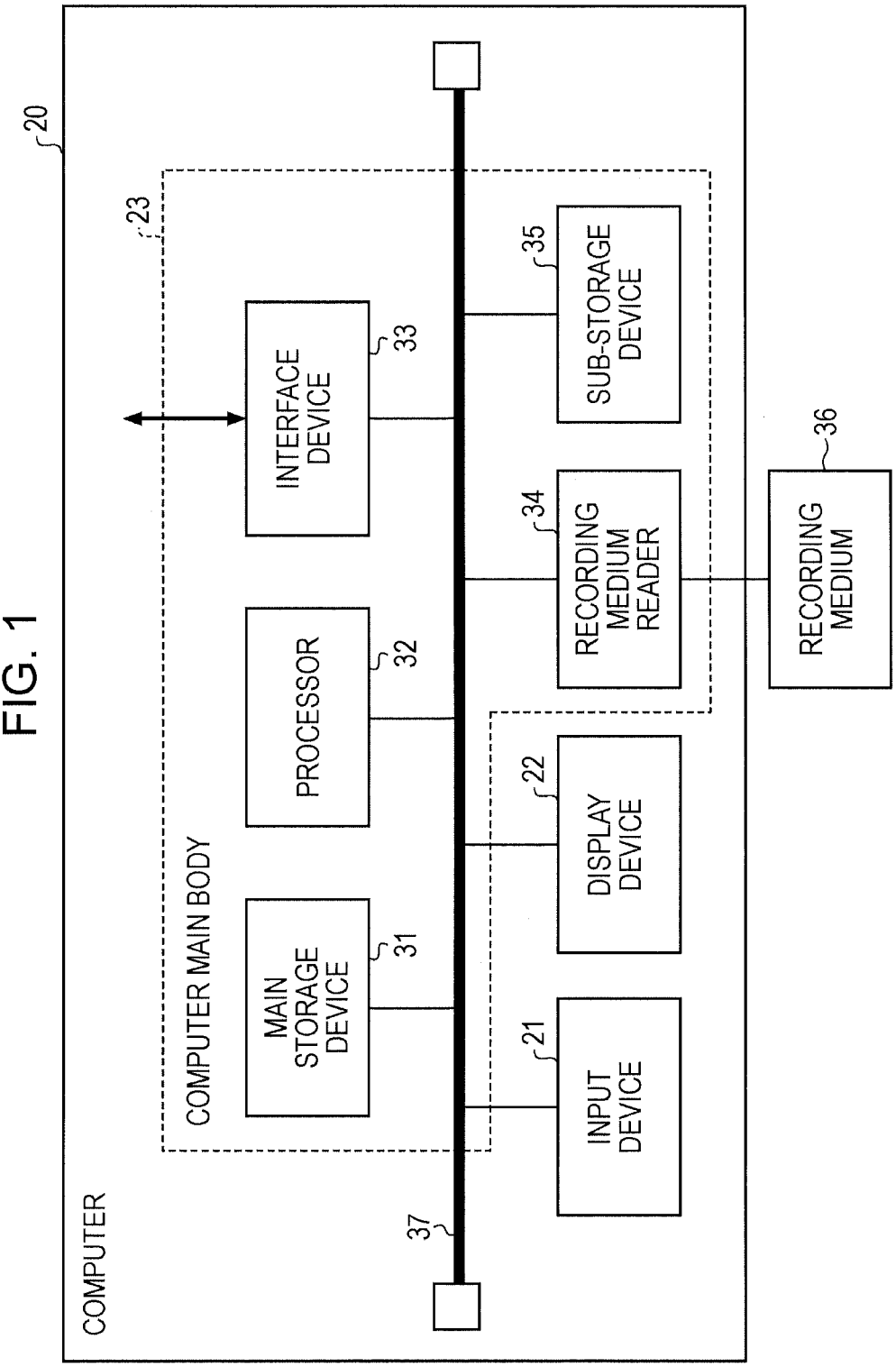
FIG. 1 is an exemplary hardware configuration diagram of a computer.

In the description given below, a personal computer and a server computer are simply and collectively referred to as a computer. The computer that is caused to execute the data storage program and the data display program of the embodiment includes hardware as illustrated in FIG. 1. FIG. 1 is an exemplary hardware configuration diagram of the computer.

A computer 20 illustrated in FIG. 1 includes an input device 21, a display device 22, and a computer main body 23. The computer main body 23 includes a main storage device 31, a processor 32, an interface device 33, a recording medium reader 34, and a sub-storage device 35 that are connected with each other through a bus 37. The input device 21 and the display device 22 are connected to the bus 37.

The input device 21, the display device 22, the main storage device 31, the processor 32, the interface device 33, the recording medium reader 34, and the sub-storage device 35 connected with each other through the bus 37 can transmit and receive data with each other under the management of the processor 32. The processor 32 is a central processing unit in charge of an overall operation control of the computer 20.

The interface device 33 receives data from a network or the like and passes the content of the data to the processor 32. The interface device 33 transmits data to the network or the like in accordance with an instruction from the processor 32.

The sub-storage device 35 stores therein at least the data storage program or the data display program for causing the computer 20 to execute a process in the data storage device or the data display device as a part of a program causing the computer 20 to implement a function similar to that of the data storage device or the data display device. The processor 32 reads the data storage program or the data display program from the sub-storage device 35 and executes the read program, thereby functioning as the data storage device or the data display device. The data storage program or the data display program may be stored in the main storage device 31 that the processor 32 can access.

The input device 21 receives an input of data under the management of the processor 32. The data storage program or the data display program may be stored in a recording medium 36 readable by the computer 20.

The recording medium 36 includes a magnetic recording medium, an optical disk, an optical magneto recording medium, and a semiconductor memory. The magnetic recording medium includes an HDD, a flexible disc (FD), and a magnetic tape (MT). The optical disc includes a DVD (Digital Versatile Disc), a DVD-RAM, a CD-ROM (Compact Disc-Read Only Memory), a CD-R (Recordable)/RW (ReWritable). The magneto optical recording medium includes an MO (Magneto-Optical disk).

The data storage program or the data display program may be made commercially available through distribution of the recording medium 36 of a portable type such as a DVD or a CD-ROM storing therein the data storage program or the data display program. For example, in the computer 20 executing the data storage program or the data display program, the recording medium reader 34 reads the data storage program or the data display program stored in the recording medium 36. The processor 32 stores the read data storage program or data display program in the main storage device 31 or the sub-storage device 35.

The computer 20 reads the data storage program or the data display program from the main storage device 31 or the sub-storage device 35 which is the storage device thereof and executes a process in accordance with the data storage program or the data display program. The processor 32 implements various types of processing described below in accordance with the data storage program and the data display program.

Figure 2:
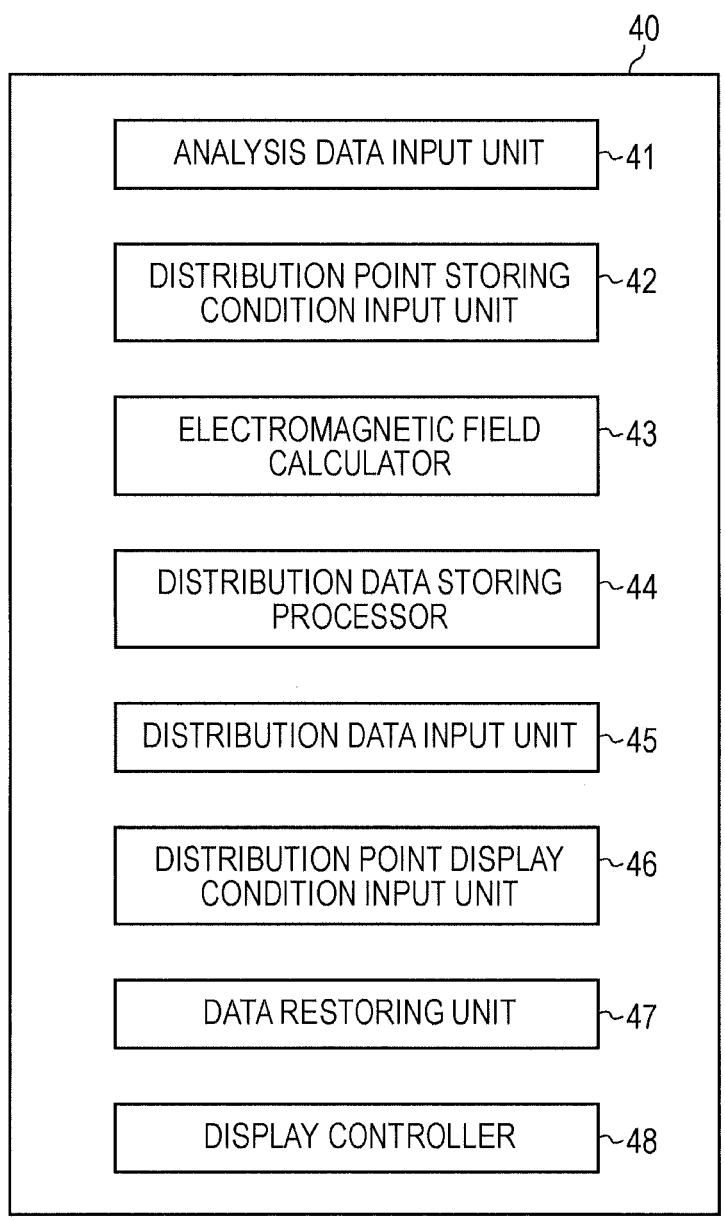
FIG. 2 is an exemplary block configuration diagram of a data analysis device of an embodiment.

Here, an example is described in which the data storage program and the data display program of the embodiment are each implemented as a function of the data analysis program using electromagnetic field calculation. For example, the computer 20 implements various types of processing in a data analysis device as illustrated in FIG. 2 in accordance with the data analysis program stored in the main storage device 31. FIG. 2 is an exemplary block configuration diagram of the data analysis device of the embodiment.

The data analysis device 40 in FIG. 2 includes an analysis data input unit 41, a distribution point storing condition input unit 42, an electromagnetic field calculator 43, a distribution data storing processor 44, a distribution data input unit 45, a distribution point display condition input unit 46, a data restoring unit 47, and a display controller 48.

Analysis data stored, for example, in the main storage device 31 or the sub-storage device 35 is inputted to the analysis data input unit 41. Storage and compression conditions for each distribution point (or a group of a plurality of distribution points) are inputted to the distribution point storing condition input unit 42.

The storing conditions include necessity of output, output interval, output time slot, output physical quantity range, output value outside the output physical quantity range, output physical quantity equivalence condition threshold value, necessity of quantization, quantized physical quantity range, and quantization resolution. The output time slot specifies an upper limit, a lower limit, and a region. The output physical quantity range specifies an upper limit, a lower limit, and a range. The output value outside the output physical quantity range specifies an upper limit and a lower limit. The compression conditions include necessity of compression, compression interval (the number of time-series data pieces to be compressed per unit operation), and compression algorithm type.

The electromagnetic field calculator 43 outputs the distribution data (physical quantity distribution data) as a result of the electromagnetic field calculation on the analysis data inputted to the analysis data input unit 41. The physical quantity distribution data output by the electromagnetic field calculator 43 is time-domain distribution data of spatially discrete physical quantities.

When storing the output physical quantity distribution data in the main storage device 31 or the sub-storage device 32 for example, the distribution data storing processor 44 stores the physical quantities at each distribution point as a time waveform (time function: relationship between time and physical quantity). In other words, the distribution data storing processor 44 chronologically stores the physical quantities at times for each of the spatially discrete distribution points. The distribution data storing processor 44 groups the physical quantities of spatially discrete distribution points at each time by each of the spatially discrete distribution points and chronologically sorts the grouped physical quantities.

The distribution data storage processor 44 compresses the time waveform of the physical quantities at each distribution point in accordance with the compression conditions inputted to the distribution point storing condition input unit 42 and stores the physical quantity distribution data in, for example, the main storage device 31 or the sub-storage device 35 in accordance with the storing conditions inputted to the distribution point storing condition input unit 42.

The distribution data stored, for example, in the main storage device 31 or the sub-storage device 35 is inputted to the distribution data input unit 45. Display conditions for each distribution point (or each group of a plurality of distribution points) are inputted to the distribution point display condition input unit 46.

The display conditions include necessity of display, display type, display range, resolution of the display device 22, and display color corresponding to physical quantity. The display type specifies the distribution map and time waveform. For displaying a distribution map of physical quantities at each time from the distribution data stored, for example, in the main storage device 31 or the sub-storage device 35 with the physical quantities stored as a time waveform at each distribution point, the data restoring unit 47 restores display data for displaying the distribution map and stores the display data in the main storage device 31 or the sub-storage device 35, for example.

For displaying the distribution map of the physical quantities at each time from the distribution data stored, for example, in the main storage device 31 or the sub-storage device 35 with the physical quantities stored as a time waveform at each distribution point, the data restoring unit 47 restores display data for displaying the distribution map in accordance with the display conditions inputted to the distribution point display condition input unit 46 and stores the display data in the main storage device 31 or the sub-storage device 35, for example.

For displaying the time waveform at each distribution point from the distribution data stored, for example, in the main storage device 31 or the sub-storage device 35 with the physical quantities stored as the time waveform at each distribution point, the data restoring unit 47 restores display data for displaying the time waveform at each distribution point in accordance with the display conditions inputted to the distribution point display condition input unit 46 and stores the display data in the main storage device 31 or the sub-storage device 35, for example. The display controller 48 causes the display device 22, for example, to display the display data stored in the main storage device 31 or the sub-storage device 35, for example.

When physical quantities at a distribution point in the last three consecutive time slots before the current output time slot are within an output physical quantity equivalence condition threshold value, the distribution data storing processor 44 may store the data of the current output time slot in place of the data in a previous time slot. The three consecutive regions are given merely as an example, and a certain number of consecutive regions such as two or four consecutive regions may be employed. The data restoring unit 47 may restore the display data by creating the display data with a distribution map of distribution points corresponding to the display range and the resolution of the display device 22 that are included in the display conditions.

As described above, instead of storing the distribution data of physical quantities at each time, the data analysis device 40 chronologically stores the distribution data of the physical quantities at each distribution point as a time waveform (time function) to provide temporal redundancy to the distribution data of the physical quantity at each distribution point. Thus, the storage region can be reduced with a general compression algorithm. This is based on a rule that the redundancy of distribution data of the temporal physical quantity is likely to be larger than the redundancy of distribution data of the spatial physical quantity.

When the distribution data is for visualizing purpose, the data analysis device 40 predetermines a storing condition such as quantization resolution of the distribution data of the physical quantity and performs quantization with a minimum resolution. Thus, the storage region can be further reduced.

As described above, the data analysis device 40 can reduce the storage region while maintaining the precision and the resolution of the distribution map of the physical quantities in a practical space model in which the shape of an object in a space is fine or complex. The data analysis device 40 may select and read the distribution data within the display region for displaying the distribution data of the physical quantity, and thus can display a plurality of specific portions at a high speed.

Figure 3:
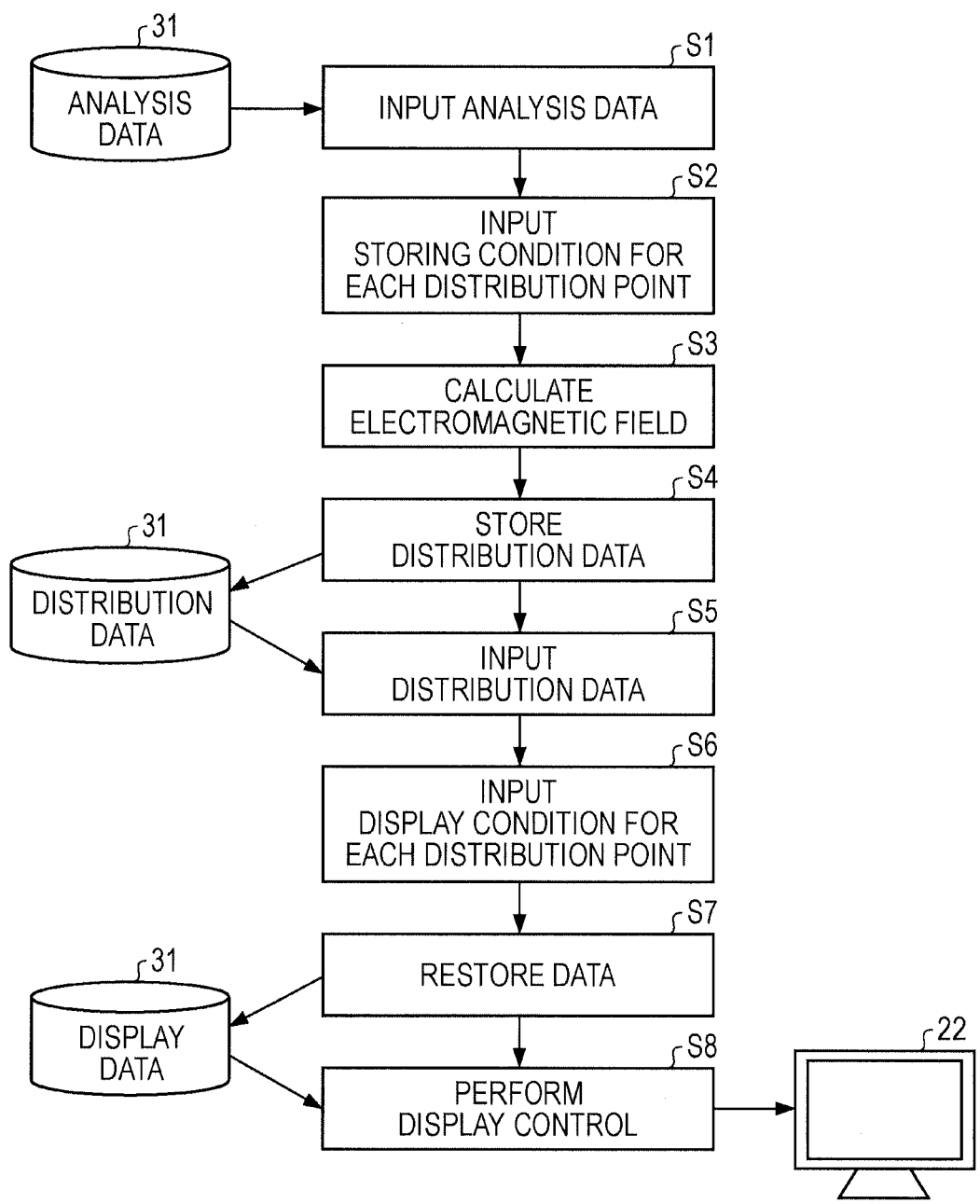
FIG. 3 is an exemplary flowchart of a procedure performed by the data analysis device of the embodiment.

FIG. 3 is an exemplary flowchart of a procedure performed by the data analysis device 40 of the embodiment. In Step S1, the analysis data stored, for example, in the main storage device 31 or the sub-storage device 35 is inputted to the analysis data input unit 41. In Step S2, the storage and compression conditions for each distribution point (or a group of a plurality of distribution points) are inputted to the distribution point storing condition input unit 42.

In Step S3, the electromagnetic field calculator 43 outputs distribution data as a result of electromagnetic field calculation on the inputted analysis data. In Step S4, the distribution data storing processor 44 stores the physical quantities at each distribution point as a time waveform (time function: relationship between time and physical quantity) when storing the output physical quantity distribution data in the main storage device 31 or the sub-storage device 35, for example.

The distribution data storing processor 44 compresses the time waveform of the physical quantities at each distribution point in accordance with the compression conditions inputted to the distribution point condition input unit 42 and stores the physical quantity distribution data in, for example, the main storage device 31 or the sub-storage device 35 in accordance with the storing conditions inputted to the distribution point condition input unit 42.

In Step S5, the distribution data stored, for example, in the main storage device 31 or the sub-storage device 35 is inputted to the distribution data input unit 45. In Step S6, the display conditions for each distribution point (or each group of a plurality of distribution points) are inputted to the distribution point display condition input unit 46.

In Step S7, for displaying the distribution map of the physical quantities at each time from the distribution data stored, for example, in the main storage device 31 or the sub-storage device 35 with the physical quantities stored as the time waveform at each distribution point, the data restoring unit 47 restores the display data for displaying the distribution map and stores the display data in the main storage device 31 or the sub-storage device 35, for example.

For displaying the distribution map of the physical quantities at each time from the distribution data stored, for example, in the main storage device 31 or the sub-storage device 35 with the physical quantities stored as the time waveform at each distribution point, the data restoring unit 47 restores the display data for displaying the distribution map in accordance with the display conditions inputted to the distribution point display condition input unit 46 and stores the display data in the main storage device 31 or the sub-storage device 35, for example.

For displaying the time waveform at each distribution point from the distribution data stored, for example, in the main storage device 31 or the sub-storage device 35 with the physical quantities stored as the time waveform at each distribution point, the data restoring unit 47 restores the display data for displaying the time waveform at each distribution point in accordance with the display conditions inputted to the distribution point display condition input unit 46 and stores the display data in the main storage device 31 or the sub-storage device 35, for example. In Step S8, the display controller 48 causes the display device 22, for example, to display the display data stored in the main storage device 31 or the sub-storage device 35, for example.

Embodiment 1

Figure 4:
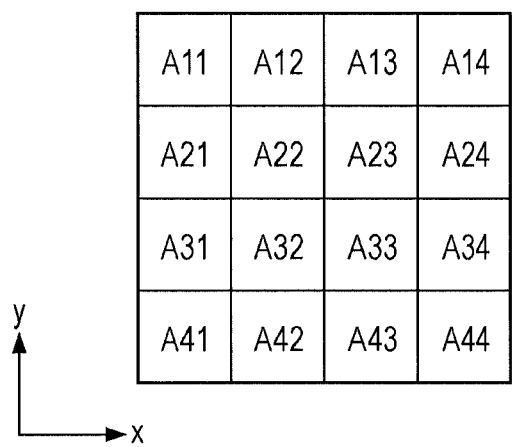
FIG. 4 is an exemplary configuration diagram of a two-dimensionally (4×4) discretized calculation model.

Storage and display methods of the physical quantity distribution data are described below with a two-dimensionally (4×4) discretized calculation model. FIG. 4 is an exemplary configuration diagram of the two-dimensionally (4×4) discretized calculation model. In FIG. 4, each distribution point is represented by Ayx (x, y=1 to 4).

Figure 5:
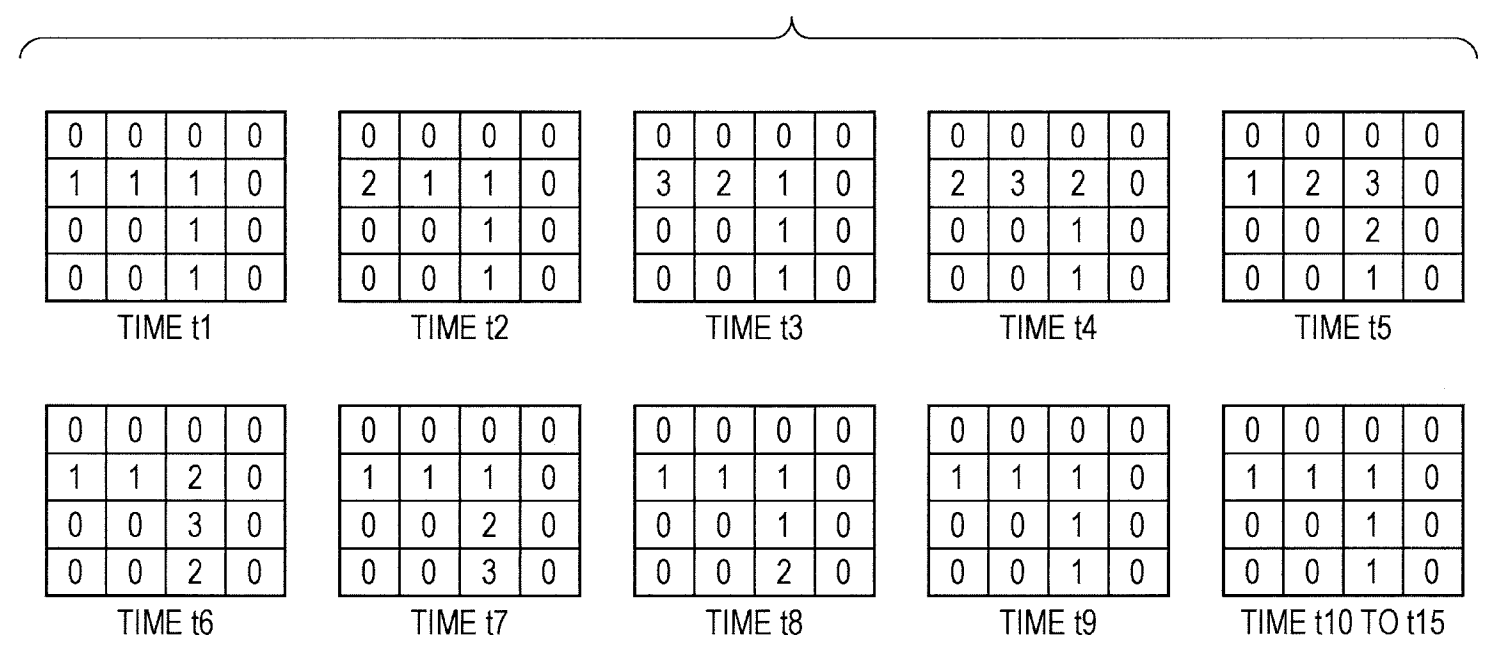

FIG. 5 is an exemplary configuration diagram illustrating physical quantity distribution data pieces as results of electromagnetic calculation on analysis data at times. In FIG. 5, respective physical quantity distribution data pieces at times t1 to t15 are illustrated. Conventionally, physical quantity distribution data pieces at each time calculated by the electromagnetic calculation in the calculation model in FIG. 4 has been stored as data in which physical quantities of the adjacent distribution points are consecutively arranged (in the order of X axis and Y axis) as illustrated in FIG. 6.

Figure 6:
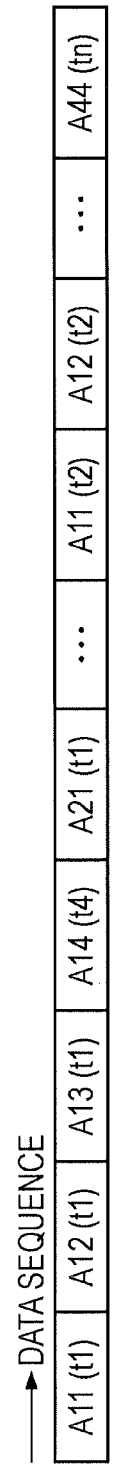
FIG. 6 is an exemplary explanatory diagram illustrating a conventional storage method for physical quantity distribution data at each time.

FIG. 6 is an exemplary explanatory diagram illustrating a conventional storage method for physical quantity distribution data at each time. In FIG. 6, Ayx(t) represents a physical quantity at a distribution point Ayx at a time t. As illustrated in FIG. 6, in the stored physical quantity distribution data, physical quantities of adjacent distribution points at each time are consecutively arranged.

FIG. 7 is an exemplary image diagram illustrating the conventional storage method for physical quantity distribution data. As illustrated in FIG. 7, the conventional storage method for the physical quantity distribution data stores the physical quantities of all the distribution points for each time.

Therefore, conventionally, huge resource (e.g., the main storage device 31 or the sub-storage device 35) has been used for storing the physical quantity distribution data. Accordingly, the technique for decimating the distribution data by time and space (spatial data for interpolation is calculated from the calculation result which is performed based on the decimated distribution data by setting the storage interval of the distribution data to every n times when the distribution data is to be stored) has been proposed.

However, in an actual device model, a model shape is complex and thus, decimating the time and the space degrades the precision and the resolution of the physical quantity distribution data. Accordingly, an effect of reducing a resource for storing the physical quantity distribution data is not very large. Moreover, for the distribution data in which redundancy of the spatially adjacent distribution points is small, the compression effect is not expected with the application of the general compression algorithm.

Figure 8:
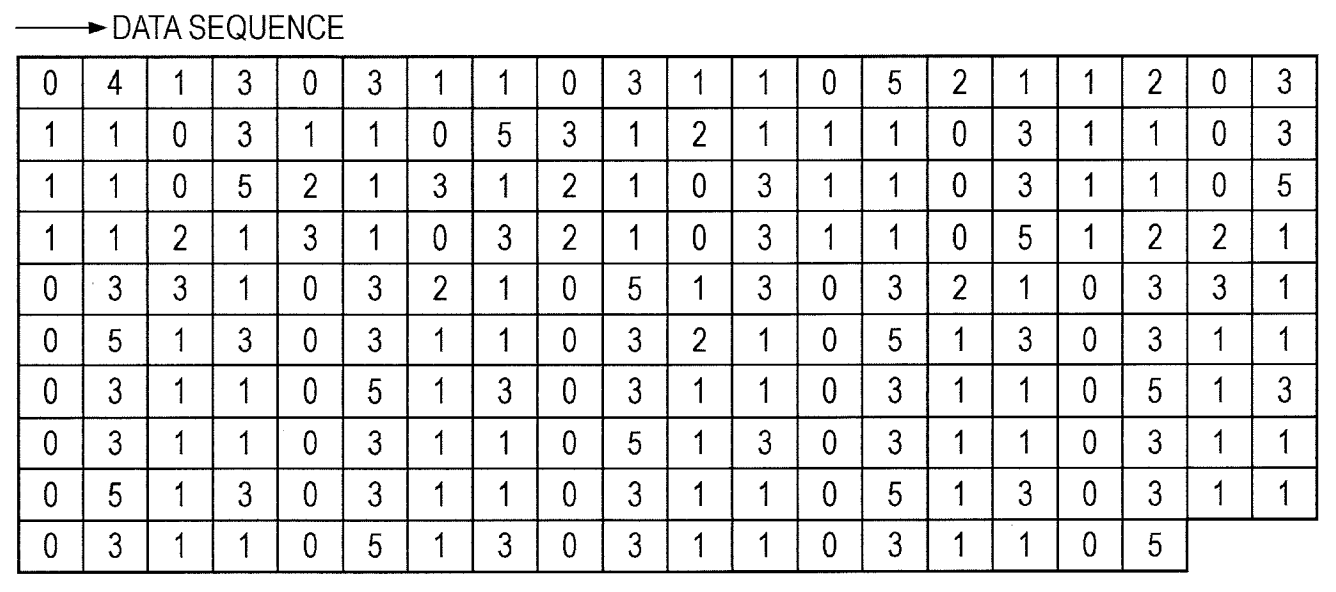

For example, physical quantity distribution data is as illustrated in FIG. 8 when a run-length method that is a general compression algorithm is applied to the physical quantity distribution data in FIG. 5 according to the conventional storage method. FIG. 8 is an exemplary image diagram illustrating the physical quantity distribution data after compression according to the conventional storage method. In FIG. 8, for example, the first sequence of "0", "4" represents that four "0s" are consecutively arranged. In the case of FIG. 8, sizes of the data storage region before and after the compression are 16×15×4 bytes=960 bytes and 99×2×4 bytes=792 bytes, respectively. Accordingly, the compression ratio is 82.5% and thus the effect of reducing the storage region is small.

Figure 9:
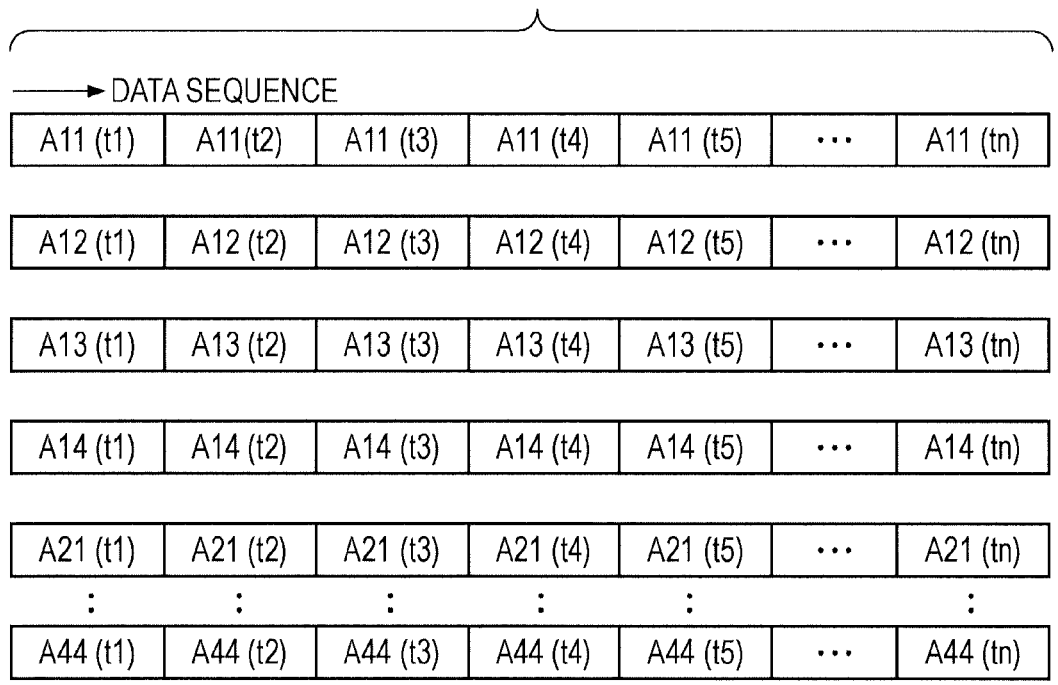
FIG. 9 is an exemplary explanatory diagram illustrating a storage method for physical quantity distribution data at each time of the embodiment.

Therefore, the embodiment stores the physical quantity distribution data at each time obtained by the electromagnetic field calculation with the calculation model in FIG. 4 in such a manner that the data of the physical quantity at each distribution point is chronologically stored as illustrated in FIG. 9. FIG. 9 is an exemplary explanatory diagram illustrating a storage method for the physical quantity distribution data at each time of the embodiment. In FIG. 9, Ayx(t) represents the physical quantity at the distribution point Ayx at the time t. As illustrated in FIG. 9, the physical quantity distribution data is stored as time-series data in which physical quantities at times are sequentially arranged for each distribution point.

Figure 10:
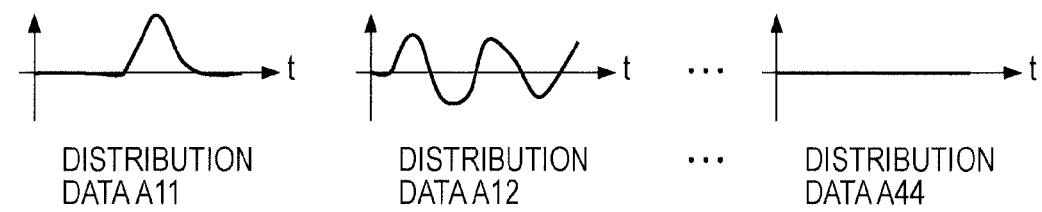
FIG. 10 is an exemplary image diagram illustrating the storage method for the physical quantity distribution data of the embodiment.

FIG. 10 is an exemplary image diagram illustrating the storage method for the physical quantity distribution data of the embodiment. As illustrated in FIG. 10, the storage method for the physical quantity distribution data of the embodiment stores the physical quantities of each distribution point as a time waveform (time function: relationship between time and physical quantity).

For example, the physical quantity distribution data after compression is as illustrated in FIG. 11 when the run-length method that is a general compression algorithm is applied to the physical quantity distribution data in FIG. 5 in accordance with the storage method of the embodiment. FIG. 11 is an exemplary image diagram illustrating the physical quantity distribution data after compression according to the storage method of the embodiment. In FIG. 11, the first sequence of "0", "15" indicates that 15 "0s" are consecutively arranged. In the case of FIG. 11, sizes of the data storage region before and after the compression are 15×4 bytes×16e=960 bytes and 72×4 bytes=288 bytes, respectively. Accordingly, the compression ratio is 30.0% and thus, the effect of reducing the storage region is about 2.75 times as much as that in the conventional storage method.

As described above, the data analysis device 40 of the embodiment stores the physical quantity distribution data as a time waveform (time function) of each distribution point, performs decimation of time or applies a general compression algorithm for each distribution point. Thus, the resource for storing the physical quantity distribution data can be reduced while the precision of the physical quantity is maintained.

In displaying the physical quantity distribution data, the data analysis device 40 of the embodiment can perform high speed displaying of a time waveform at a desired distribution point, a distribution map of the physical quantity distribution data in which a phase difference is set for each distribution point, and the physical quantity distribution data of distribution points included in a desired range.

When the distribution data as a result of the electromagnetic field calculation is as illustrated in FIG. 12, when ZIP that is a general compression algorithm is applied, while the distribution data storage region before the compression is 7.01 megabytes (MB), the data storage region after the compression is 6.54 MB with the conventional storage method and is 2.56 MB with the storage method of the embodiment. Accordingly, the compression ratio of the embodiment is 2.6 times as much as that of the conventional storage method. Further improvement of the compression ratio can be expected by combining the quantization physical quantity range and the output physical quantity range before the compression.

Figure 14:
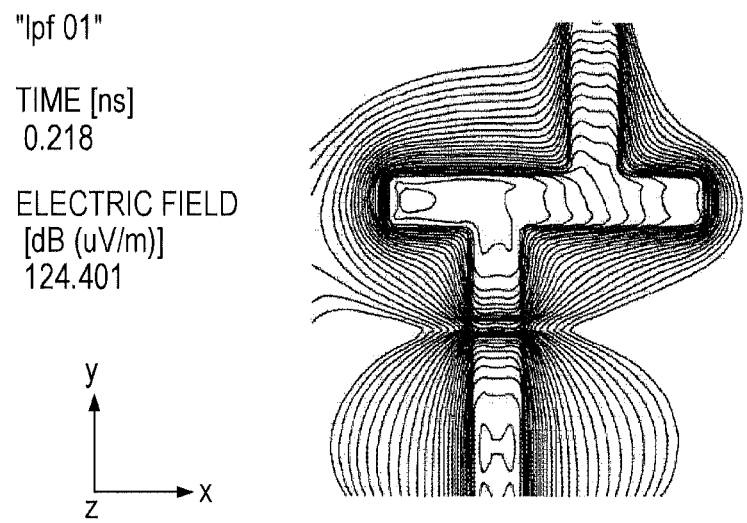
FIG. 14 is another exemplary image diagram of a distribution map of physical quantity distribution data.
Figure 15:
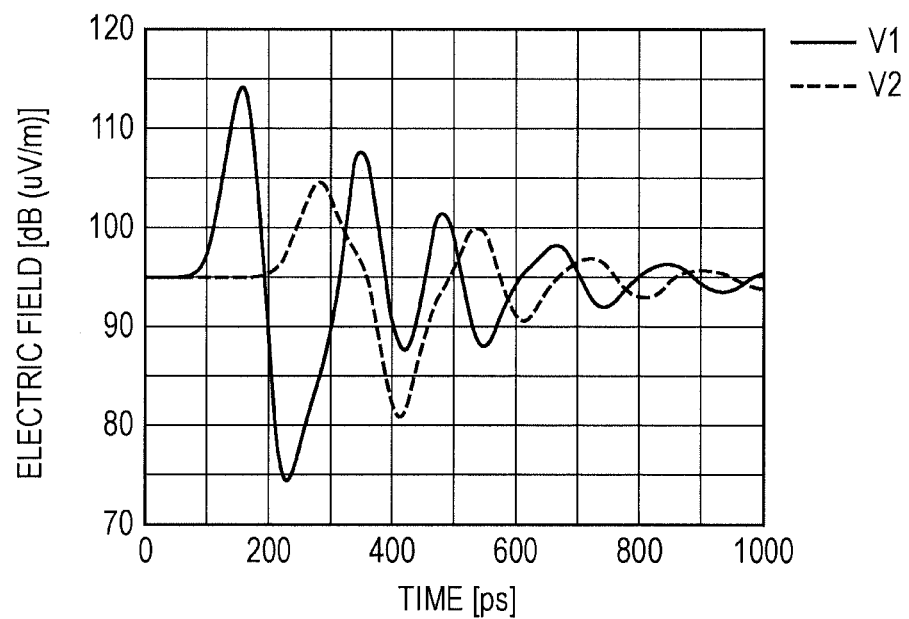
FIG. 15 is an exemplary image diagram of a time waveform at a given distribution point.

FIG. 12 is an exemplary image diagram of a distribution map as a result of an electromagnetic field calculation. FIG. 13 is an exemplary image diagram of a distribution map of physical quantity distribution data. FIG. 14 is another exemplary image diagram of a distribution map of physical quantity distribution data. FIG. 15 is an exemplary image diagram of a time waveform at a given distribution point.

In a similar manner, the data analysis device 40 of the embodiment can store and display the physical quantity data in a case where a three dimensionally discretized calculation model is used.

Figure 16:
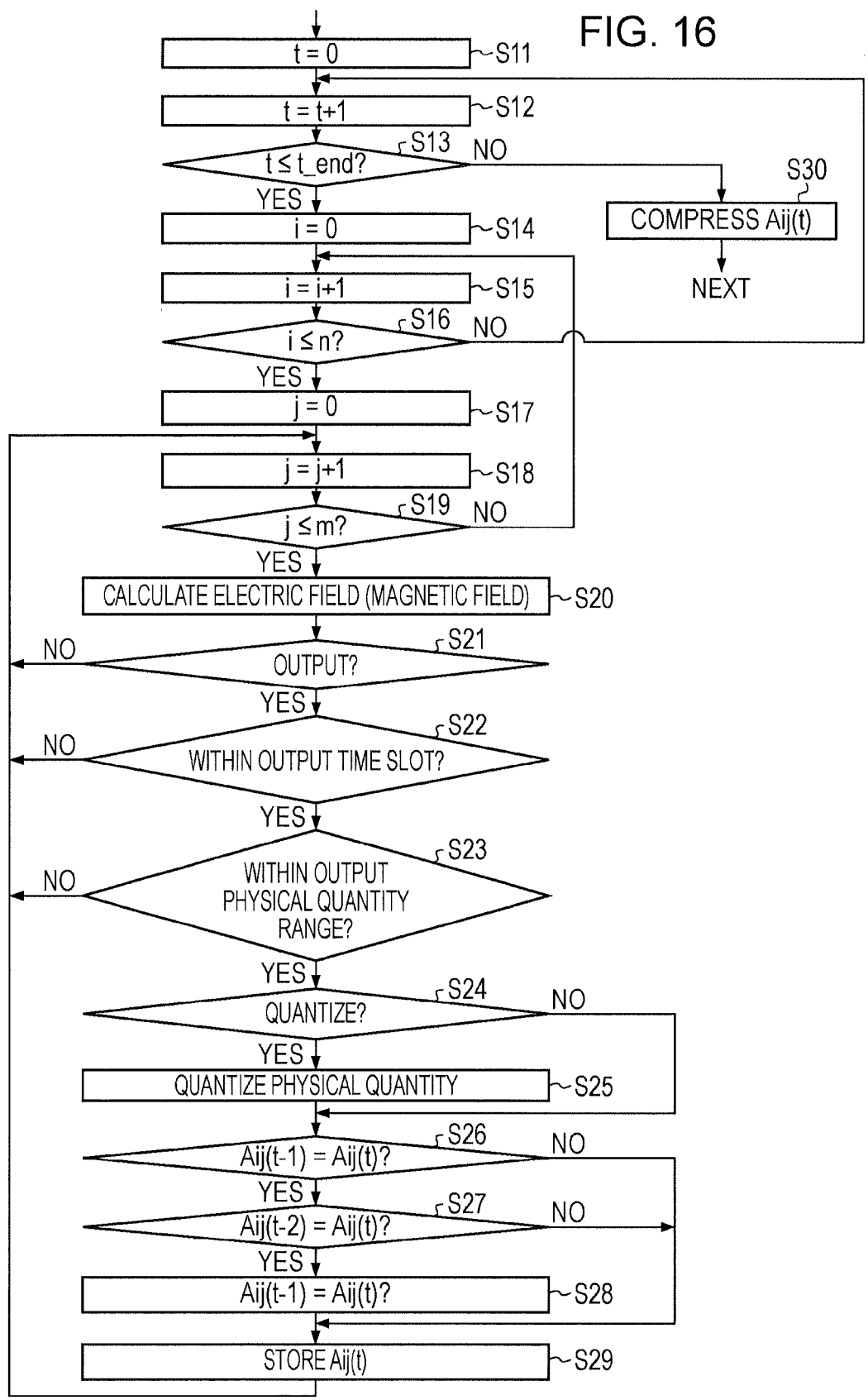
FIG. 16 is an exemplary flowchart of a storing process performed by the data analysis device of the embodiment.

FIG. 16 is an exemplary flowchart of a storing process performed by the data analysis device of the embodiment. FIG. 16 corresponds to Steps S3 and S4 in FIG. 3.

In Step S11 the electromagnetic field calculator 43 sets t representing a time to "0". In Step S12, the electromagnetic field calculator 43 adds "1" to t. "1" added to t in Step S12 corresponds to an interval of the electromagnetic field calculation on the analysis data.

In Step S13, the electromagnetic field calculator 43 determines whether t representing a time is equal to or smaller than t_end representing a completion time of the electromagnetic field calculation on the analysis data. For example, t_end=tn in the example in FIG. 9.

If t is equal to or smaller than t_end, the electromagnetic field calculator 43 sets i representing a coordinate of the distribution point in the y direction to "0" in Step S14. In Step S15 the electromagnetic field calculator 43 adds "1" to i. In Step S16, the electromagnetic field calculator 43 determines whether i representing the coordinate in the y direction is equal to or smaller than n representing the maximum coordinate of the distribution point in the y direction.

If i is equal to or smaller than n, the electromagnetic field calculator 43 sets j representing the coordinate of the distribution point in the x direction to "0" in Step S17. In Step S18, the electromagnetic field calculator 43 adds "1" to j. In Step S19, the electromagnetic field calculator 43 determines whether j representing the coordinate in the x direction is equal to or smaller than m representing the maximum coordinate in the x direction.

If j is equal to or smaller than m, the electromagnetic field calculator 43 performs electromagnetic field calculation on the analysis data in Step S20. In Step S21, the distribution data storage processing unit 44 determines whether to output the physical quantity as the result of the electromagnetic field calculation in accordance with the necessity of output as the storing condition inputted to the distribution point storing condition input unit 42.

In Step S22, the distribution data storing processor 44 determines whether to output the physical quantity as a result of the electromagnetic field calculation in accordance with the output time slot as the storing condition inputted to the distribution point storing condition input unit 42.

In Step S23, the distribution data storing processor 44 determines whether to output the physical quantity as the result of the electromagnetic field calculation in accordance with the output physical quantity range as the storing condition inputted to the distribution point storing condition input unit 42.

When determining to output the physical quantity as the result of the electromagnetic field calculation in Steps S21 to S23, the distribution data storage processor 44 determines, in Step S24, whether to quantize the physical quantity as the result of the electromagnetic field calculation in accordance with the necessity of the quantization as the storing condition inputted to the distribution point storing condition input unit 42.

When determining to quantize the physical quantity as the result of the electromagnetic field calculation, in Step S25, the distribution data storing processor 44 quantizes the physical quantity as the result of the electromagnetic field calculation in accordance with the quantization resolution as the storing condition input to the distribution point storing condition input unit 42.

In Step S26, the distribution data storing processor 44 determines whether the physical quantity Aij(t−1) at the time t−1 and the physical quantity Aij(t) at the time t of the distribution point Aij are equal. If the physical quantity Aij(t−1) at the time t−1 and the physical quantity Aij(t) at the time t are equal, the distribution data storing processor 44 determines, in Step S27, whether the quantity Aij(t−2) at a time t−2 and the physical quantity Aij(t) at the time t are equal.

If the physical quantity Aij(t−2) at the time t−2 and the physical quantity Aij(t) at the time t of the distribution point Aij are equal, the distribution data storing processor 44 replaces the physical quantity Aij(t−1) at the time t−1 with the physical quantity Aij(t) at the time t in Step S28. In Step S29, the distribution data storing processor 44 stores the physical quantity Aij(t) at the time t in the main storage device 31 or the sub-storage device 35, for example. Here, the distribution data storing processor 44 chronologically stores the physical quantities at each distribution point as illustrated in FIG. 9. The distribution data storing processor 44 groups the physical quantities of the distribution points at each time by each of the distribution points and chronologically sorts the grouped physical quantities.

If i is not equal to or larger than n in Step S16, the electromagnetic field calculator 43 adds "1" to t in Step S12 and continues the process. If j is not equal to or larger than m in Step S19, the electromagnetic field calculator 43 adds "1" to i in Step S15 and continues the process.

When determining not to output the physical quantity as the result of the electromagnetic field calculation in Steps S21 to S23, the electromagnetic field calculator 43 adds "1" to j in Step S18 and continues the process.

In Step S26, if the physical quantity Aij(t−1) at the time t−1 and the physical quantity Aij(t) at the time t at the distribution point Aij are not equal, the distribution data storing processor 44 stores the physical quantity Aij(t) at the time t in, for example, the main storage device 31 or the sub-storage device 35 in Step S29.

In Step S27, if the physical quantity Aij(t−2) at the time t−2 and the physical quantity Aij(t) at the time t at the distribution point Aij are not equal, the distribution data storing processor 44 stores the physical quantity Aij(t) at the time t in, for example, the main storage device 31 or the sub-storage device 35 in Step S29.

After storing the physical quantity Aij(t) at the time t in, for example, the main storage device 31 or the sub-storage device 35 in Step S29, the distribution storing processor 44 adds "1" to j in Step S18 and continues the process.

In Step S13, if t is larger than t_end, in Step S30, the distribution storing processor 44 applies a general compression algorithm to each distribution point Aij to compress the physical quantity Aij(t), and terminates the process in the flowchart of FIG. 16.

Figure 17:
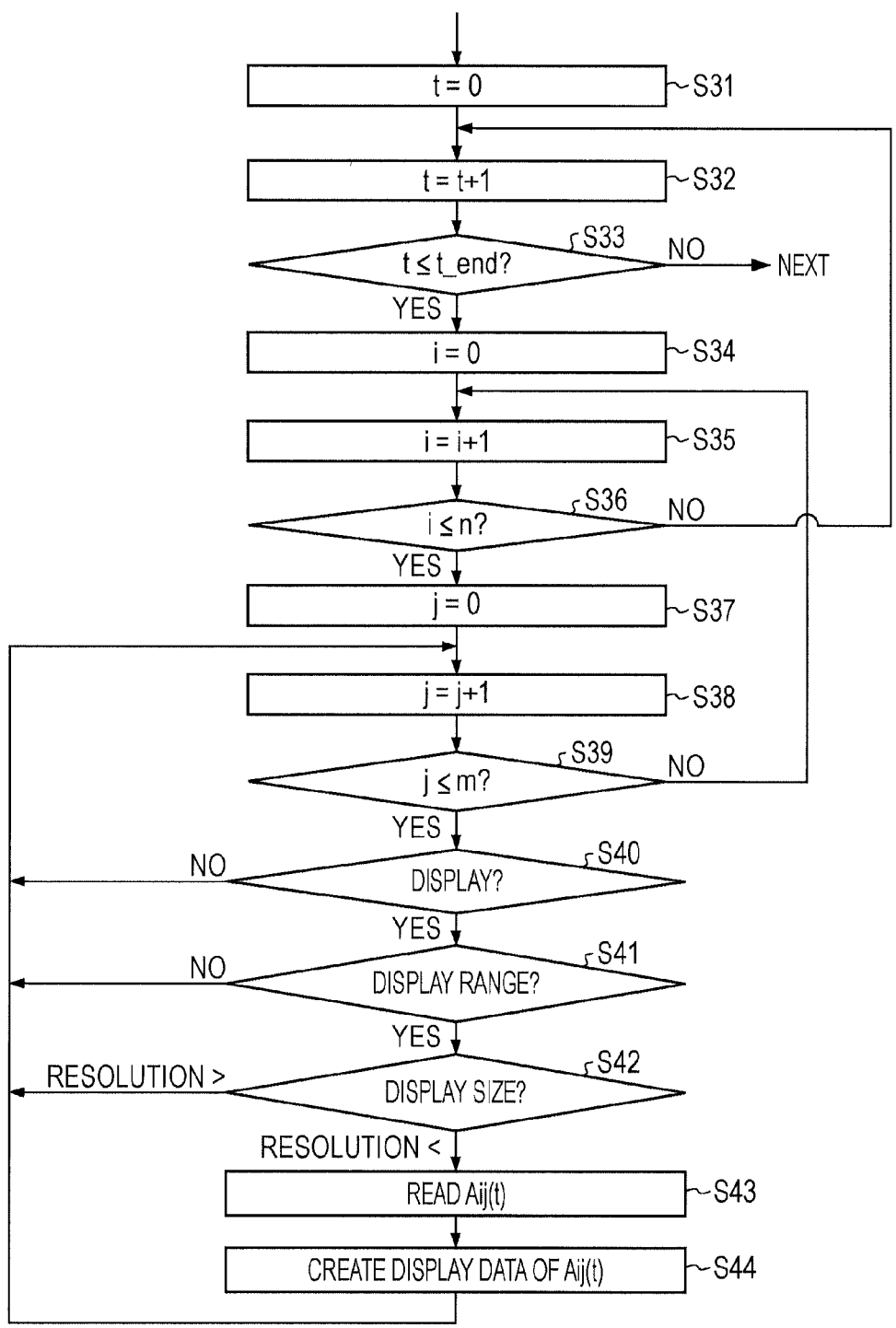
FIG. 17 is an exemplary flowchart of a display process performed by the data analysis device of the embodiment.

FIG. 17 is an exemplary flowchart of a display process performed by the data analysis device according to the embodiment. The flowchart of FIG. 17 corresponds to Step S7 in FIG. 3.

In Step S31, the data restoring unit 47 sets t representing a time to "0". In Step S32, the data restoring unit 47 adds "1" to t. "1" corresponds to an interval of the electromagnetic calculation on the analysis data.

In Step S33, the data restoring unit 47 determines whether t representing a time is equal to or smaller than t_end representing the completion time of the electromagnetic field calculation on the analysis data. In the example of FIG. 9, t_end=tn for example.

If t is equal to or smaller than t_end, the data restoring unit 47 sets i representing a coordinate of the distribution point in the y direction to "0" in Step S34. In Step S35, the data restoring unit 47 adds "1" to i. In Step S36, the data restoring unit 47 determines whether i representing the coordinate in the y direction is equal to or smaller than n representing the maximum coordinate in the y direction.

If i is equal to or smaller than n, the data restoring unit 47 sets j representing a coordinate of a distribution point in the x direction to "0" in Step S37. In Step S38, the data restoring unit 47 adds "1" to j. In Step S39, the data restoring unit 47 determines whether j representing the coordinate in the x direction is equal to or smaller than m representing the maximum coordinate in the x direction.

If j is equal to or smaller than m, the data restoring unit 47 determines, in Step 40, whether to display physical quantity as the result of the electromagnetic field calculation in accordance with the necessity of display as the display condition inputted to the distribution point display condition input unit 46.

In Step S41 the data restoring unit 47 determines whether to display the physical quantity as the result of the electromagnetic field calculation in accordance with the display range as the display condition inputted to the distribution point display condition input unit 46.

In Step S42 the data restoring unit 47 determines whether to display the physical quantity as the result of the electromagnetic field calculation in accordance with the resolution of the display device 22 as the display condition inputted to the distribution point display condition input unit 46. When determining to display the physical quantity as the result of the electromagnetic field calculation in Steps S40 to S42, in Step S43, the data restoring unit 47 reads the physical quantity Aij(t) grouped and chronologically stored for each distribution point. In Step S44, the data restoring unit 47 creates display data of the physical quantity Aij(t) read in Step S43.

If i is larger than n in Step S36, the data restoring unit 47 adds "1" to t in Step S32 and continues the process. If j is larger than m in Step S39, the data restoring unit 47 adds "1" to i in Step S35 and continues the process.

When determining not to display the physical quantity as a result of the electromagnetic field calculation in Steps S40 to S42, the data restoring unit 47 adds "1" to j in Step S38 and continues the process. After creating the display data of the physical quantity Aij(t) at the time t in Step S44, the data restoring unit 47 adds "1" to j in Step S38 and continues the process.

If t is larger than t_end in Step S33, the data restoring unit 47 terminates the process in the flowchart of FIG. 17.

Figure 18:
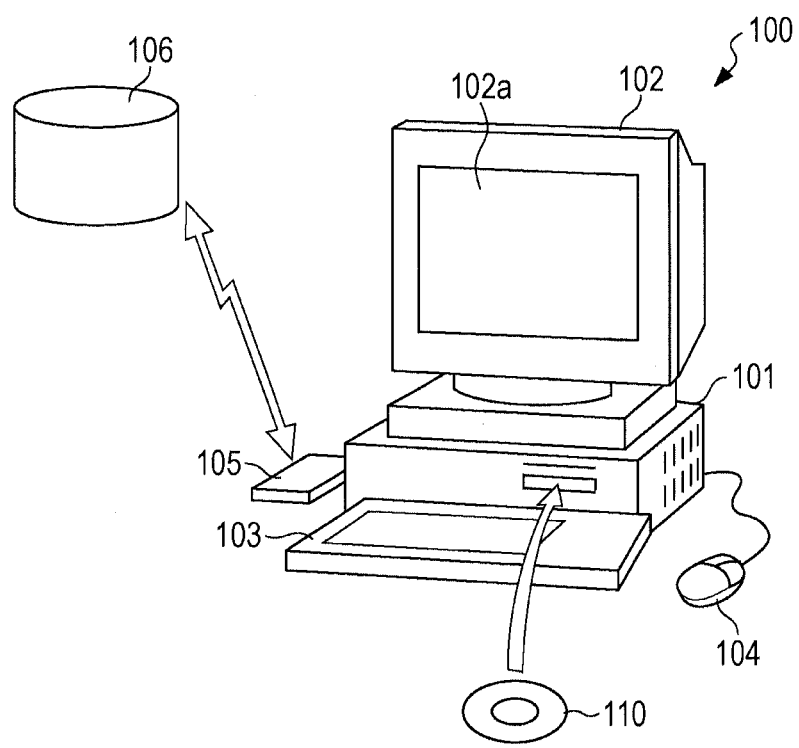
FIG. 18 is an exemplary outer view of a computer.

FIG. 18 is an exemplary outer view of a computer. In FIG. 18, the computer 100 has a known configuration including: a main body unit 101 incorporating a central processing unit (CPU), a disk drive, and the like; a display 102 that displays an image on a display screen 102a in accordance with an instruction from the main body unit 101; a keyboard 103 for inputting various information pieces and instructions to the computer 100; a mouse 104 for designating a desired position on the display screen 102a of the display 102; and a modem 105 for accessing an external database 106. A program stored in a portable storage medium such as a disk 110 or downloaded from the external data base 106 by using the modem 105 is inputted to the computer 100 to be executed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable medium that stores therein a program causing a computer to execute a process comprising:

obtaining first data by grouping values indicating physical quantities of spatially discrete distribution points at each of times by each of the spatially discrete distribution points and chronologically sorting the grouped values, the first data being defined as time-series data in which the physical quantities at the times are chronologically stored for each of the spatially discrete distribution points;

obtaining second data by compressing the first data in accordance with at least one of a plurality of compression conditions for each of the distribution points or each group of a plurality of the distribution points, the plurality of compression conditions including a necessity of compression, a compression interval, and a compression algorithm type;

storing the second data in a storage device; and handling values of the second data which are within an output physical quantity equivalence condition threshold value as the same value when the values are within the output physical quantity equivalence condition threshold value in a predetermined number of consecutive time slots, the output physical quantity equivalence condition threshold value being a storage condition for each of the distribution points or each group of a plurality of the distribution points.

2. The non-transitory computer-readable medium according to claim 1 the process further comprising
storing the second data in accordance with at least one of a plurality of storage conditions for each of the distribution points or each group of a plurality of the distribution points, the plurality of storage conditions including a necessity of output, output interval, output time slot, output physical quantity range, necessity of quantization, quantized physical quantity range, and quantization resolution.

3. The non-transitory computer-readable medium according to claim 1, the process further comprising:
creating display data for a distribution map of the values of spatially discrete distribution points at each of times on the basis of the second data stored in the storage device.

4. The non-transitory computer-readable medium according to claim 3, the process further comprising
creating the display data for the distribution map in accordance with at least one of a plurality of display conditions for each of the distribution points or each group of a plurality of the distribution points, the plurality of display conditions including a necessity of display, display type, display range, resolution of the display device, and display color corresponding to physical quantity.

5. The non-transitory computer-readable medium according to claim 3, the process further comprising
creating the display data for the distribution map in accordance with at least one of a plurality of display conditions for each of the distribution points or each group of a plurality of the distribution points, the plurality of display conditions including a resolution of the display device and a display range.

6. The non-transitory computer-readable medium according to claim 1, wherein
the spatially discrete distribution points are points that are distributed in N dimensional space where N is a natural number.

* * * * *